US010535137B2

(12) United States Patent
Oshima et al.

(10) Patent No.: US 10,535,137 B2
(45) Date of Patent: Jan. 14, 2020

(54) ANALYSIS SYSTEM AND ANALYSIS METHOD

(71) Applicant: SONY CORPORATION, Tokyo (JP)

(72) Inventors: Shiori Oshima, Kanagawa (JP); Eriko Matsui, Tokyo (JP)

(73) Assignee: SONY CORPORATION, Tokyo (JP)

( * ) Notice: Subject to any disclaimer, the term of this patent is extended or adjusted under 35 U.S.C. 154(b) by 266 days.

(21) Appl. No.: 15/106,858

(22) PCT Filed: Dec. 18, 2014

(86) PCT No.: PCT/JP2014/006327
§ 371 (c)(1),
(2) Date: Jun. 21, 2016

(87) PCT Pub. No.: WO2015/104763
PCT Pub. Date: Jul. 16, 2015

(65) Prior Publication Data
US 2017/0039713 A1 Feb. 9, 2017

(30) Foreign Application Priority Data

Jan. 7, 2014 (JP) .................................. 2014-000843

(51) Int. Cl.
*G06K 9/00* (2006.01)
*G06T 7/00* (2017.01)
*G02B 21/00* (2006.01)

(52) U.S. Cl.
CPC .......... *G06T 7/0016* (2013.01); *G02B 21/006* (2013.01); *G02B 21/0028* (2013.01);
(Continued)

(58) Field of Classification Search
CPC .. G02B 21/244; G02B 21/367; G02B 21/002; G02B 21/0024; G02B 21/0056; G02B 21/0028; G02B 21/006; H04N 5/23212
See application file for complete search history.

(56) References Cited

U.S. PATENT DOCUMENTS 4,902,101 A * 2/1990 Fujihara ............... G02B 21/244
                                                    359/383
7,801,682 B2 * 9/2010 Mai .......................... C12Q 1/68
                                                    702/19
(Continued)

FOREIGN PATENT DOCUMENTS

EP       2 860 568     * 4/2015  ............. G02B 21/36
JP      2003-093378 A    4/2003
(Continued)

OTHER PUBLICATIONS

Susan Breslin et al., "Three-Dimensional Cell Culture: The Missing Link in Drug Discovery", Rug Discovery Today, Mar. 2013, pp. 240-249, vol. 18, Nos. 5/6, Ireland.
(Continued)

*Primary Examiner* — Avinash Yentrapati
(74) *Attorney, Agent, or Firm* — Chip Law Group

(57) ABSTRACT

An analysis system according to the present technique includes a feature amount calculation section and a reference position calculation section. The feature amount calculation section calculates a feature amount in each of a plurality of moving images of a sample including an observation object, that have been captured at different focal positions, the plurality of moving images having the same phase of movements. The reference position calculation section calculates a reference position of the observation object in a focus direction based on the feature amount.

9 Claims, 15 Drawing Sheets

(52) U.S. Cl.
CPC .............. *G02B 21/0056* (2013.01); *G06T 2207/10021* (2013.01); *G06T 2207/10056* (2013.01); *G06T 2207/10148* (2013.01); *G06T 2207/30024* (2013.01); *G06T 2207/30048* (2013.01)

(56) References Cited

U.S. PATENT DOCUMENTS

| | | | | |
|---|---|---|---|---|
| 7,916,304 B2* | 3/2011 | Hess | ............... | G01B 9/04 356/496 |
| 8,781,257 B2* | 7/2014 | Bruijns | ............... | G06T 7/30 382/294 |
| 9,998,658 B2* | 6/2018 | Ou | ............... | G02B 21/084 |
| 2003/0016851 A1* | 1/2003 | Kaufman | ............... | A61B 6/032 382/131 |
| 2003/0103662 A1* | 6/2003 | Finkbeiner | ............... | G01N 21/253 382/128 |
| 2003/0184730 A1* | 10/2003 | Price | ............... | G01N 21/6458 356/39 |
| 2004/0076315 A1* | 4/2004 | Scoll | ............... | G06T 7/0012 382/128 |
| 2005/0031183 A1* | 2/2005 | Wrigglesworth | ............... | G06T 7/20 382/133 |
| 2005/0053267 A1* | 3/2005 | Mostafavi | ............... | G06T 7/254 382/128 |
| 2005/0082494 A1* | 4/2005 | Motomura | ............... | G02B 21/002 250/458.1 |
| 2005/0201604 A1* | 9/2005 | Hristov | ............... | G06T 11/008 382/131 |
| 2005/0259864 A1* | 11/2005 | Dickinson | ............... | G06K 9/00134 382/154 |
| 2006/0239538 A1* | 10/2006 | Sato | ............... | A61B 5/0064 382/154 |
| 2007/0189436 A1 | 8/2007 | Goto et al. | | |
| 2008/0225278 A1* | 9/2008 | Namba | ............... | G01N 21/6458 356/123 |
| 2009/0086314 A1* | 4/2009 | Namba | ............... | G01N 21/6458 359/383 |
| 2009/0237501 A1* | 9/2009 | Lemmer | ............... | G01N 21/6428 348/79 |
| 2009/0290156 A1* | 11/2009 | Popescu | ............... | G01N 15/1434 356/338 |
| 2010/0135566 A1* | 6/2010 | Joanidopoulos | ............... | G06K 9/0014 382/133 |
| 2010/0172020 A1* | 7/2010 | Price | ............... | G02B 21/0016 359/381 |
| 2010/0195868 A1* | 8/2010 | Lu | ............... | G02B 21/0084 382/103 |
| 2010/0284016 A1* | 11/2010 | Teitell | ............... | G01J 3/453 356/451 |
| 2011/0234828 A1* | 9/2011 | Kunihiro | ............... | G06T 7/223 348/220.1 |
| 2012/0057766 A1* | 3/2012 | Drozdzal | ............... | A61B 1/041 382/128 |
| 2012/0123267 A1* | 5/2012 | Dow | ............... | A61B 8/02 600/443 |
| 2013/0070971 A1* | 3/2013 | Kunihiro | ............... | G06K 9/4642 382/107 |
| 2013/0202151 A1* | 8/2013 | Dauwels | ............... | G06T 7/0002 382/100 |
| 2013/0229663 A1* | 9/2013 | Yang | ............... | A61B 5/0062 356/497 |
| 2014/0064594 A1* | 3/2014 | Sugiyama | ............... | C12M 41/36 382/133 |
| 2014/0118529 A1* | 5/2014 | Zheng | ............... | G21K 7/00 348/80 |
| 2014/0300723 A1* | 10/2014 | Oshima | ............... | G02B 21/365 348/79 |
| 2014/0375792 A1* | 12/2014 | Yaqoob | ............... | G02B 21/14 348/79 |
| 2015/0146081 A1* | 5/2015 | Oshima | ............... | G02B 21/367 348/353 |
| 2015/0310613 A1* | 10/2015 | Murakami | ............... | G02B 21/365 382/128 |
| 2016/0011409 A1* | 1/2016 | Oshima | ............... | H04N 5/23212 348/80 |
| 2016/0305883 A1* | 10/2016 | Betzig | ............... | G02B 21/16 |
| 2016/0327779 A1* | 11/2016 | Hillman | ............... | G02B 21/367 |
| 2017/0038574 A1* | 2/2017 | Zhuang | ............... | G02B 21/0068 |
| 2018/0262758 A1* | 9/2018 | El-Ghoroury | ............... | G06F 3/14 |

FOREIGN PATENT DOCUMENTS

| | | | | |
|---|---|---|---|---|
| JP | 2005-128086 A | | 5/2005 | |
| JP | 2012-531933 A | | 12/2012 | |
| JP | WO2013/183233 | * | 12/2013 | ............ G02B 21/36 |
| WO | 2004/109228 A | | 12/2004 | |
| WO | 2005/122901 A | | 12/2005 | |

OTHER PUBLICATIONS

Susan Breslin et al., "Three-dimensional cell culture: the missing link in drug discovery", Drug Discovery Today, vol. 18, Nos. 5/6, Mar. 2013, 10 pages.

* cited by examiner

ANALYSIS SYSTEM AND ANALYSIS METHOD

CROSS REFERENCE TO RELATED APPLICATIONS

This application is a U.S. National Phase of International Patent Application No. PCT/JP2014/006327 filed on Dec. 18, 2014, which claims priority benefit of Japanese Patent Application No. JP 2014-000843 filed in the Japan Patent Office on Jan. 7, 2014. Each of the above-referenced applications is hereby incorporated herein by reference in its entirety.

TECHNICAL FIELD

The present technique relates to an analysis system, an analysis program, and an analysis method that are used to analyze a state of an observation object based on a moving image captured by a microscope.

BACKGROUND ART

In recent years, 3D cultivations of moving cells such as cardiac myocytes have become popular (see, for example, Non-patent Document 1). Unlike 2D cultivations in which a cell group 2-dimensionally forms a single layer, the 3D cultivations can obtain cell groups connected 3-dimensionally and obtain cell groups in a state close to an actual intravital state.

It is required to realize, in observing such 3D-cultivated cells as the observation object, a 3-dimensional recognition (3D recognition) of the state of the observation object. As a method of realizing the 3D recognition, there is a method that uses a scan-type microscope system such as a scan-type two-photon excitation laser microscope and confocal laser microscope. In the scan-type microscope system, the 3D recognition of the observation object is realized by 2-dimensionally scanning it while changing a laser focal position in an optical-axis direction (see, for example, Patent Document 1).

The 3D recognition is also realized by carrying out image processing on an image captured with a microscope. For example, a 3D image of an observation object can be obtained by using an autofocus function of detecting a focal plane or a function of generating an omnifocal image.

Patent Document 1: Japanese Patent Application Laid-open No. 2005-128086
Non-patent Document 1: Three-dimensional cell culture: the missing link in drug discovery., Drug Discov Today. 2013 March; 18(5-6):240-9.

SUMMARY OF INVENTION

Problem to be Solved by the Invention

Since the 3D-cultivated cells are close to the intravital state as described above, if such a state can be observed over time, a large amount of information can be obtained. However, since the laser is scanned in spots in the case of the 3D recognition using the scan-type microscope system, it is difficult to realize high speed, thus being inadequate for observing changes of the observation object over time. Moreover, there is a fear that the laser irradiation may damage the cells and inhibit physiological states of the cells.

Even in the method that uses image processing, a 3D image of an observation object is generated using a still image taken with a certain focal distance. In other words, while it is possible to observe an instantaneous state of the observation object, the method is inadequate for observing changes of the observation object over time.

In view of the circumstances as described above, the present technique aims at providing an analysis system, an analysis program, and an analysis method that are suited for analyzing 3-dimensional temporal changes of an observation object.

Means for Solving the Problem

To attain the object described above, according to an embodiment of the present technique, there is provided an analysis system including a feature amount calculation section and a reference position calculation section.

The feature amount calculation section calculates a feature amount in each of a plurality of moving images of a sample including an observation object, that have been captured at different focal positions, the plurality of moving images having the same phase of movements.

The reference position calculation section calculates a reference position of the observation object in a focus direction based on the feature amount.

With this structure, by the feature amount calculation section targeting the moving images having the same phase of movements in calculating the feature amount, even when the moving images captured at the respective focal positions are captured in different time slots, it becomes possible to grasp the movements in the focus direction. Further, by the reference position calculation section calculating the reference position, it becomes possible to quantifiably evaluate the movements of the observation object in the focus direction. In addition, since the analysis system is capable of performing an analysis by image processing and there is no need to irradiate laser and the like onto the observation object, the analysis can be performed without inhibiting the physiological state of the observation object.

The analysis system may further include: a movement analysis section that analyzes a movement in each of the plurality of moving images; and a phase alignment section that aligns phases of the plurality of moving images using a movement analysis result obtained by the movement analysis section.

When taking a plurality of moving images at different focal positions, image pickup times of the moving images differ. Therefore, even when the analysis is merely performed on the plurality of moving images, the movement of the observation object in the focus direction cannot be grasped. In contrast, with the structure described above, since the phase alignment section aligns the phases among the plurality of moving images, it becomes possible to grasp the movement of the observation object in the focus direction from the plurality of moving images having different focal positions and image pickup times.

The movement analysis section may extract pulse timings attributed to a pulse of the observation object in each of the plurality of moving images, and the phase alignment section may align the phases of the plurality of moving images so that the pulse timings match among the plurality of moving images.

When the observation object is a cell having pulses, such as a cardiac myocyte, the pulses appear as movements in each of the moving images. Therefore, the movement analysis section can extract a characteristic point of the movement as the pulse timing, and the phase alignment section can align the phases of the plurality of moving images using the pulse timings.

The feature amount may be a luminance difference, and the reference position calculation section may calculate the reference position based on the luminance difference.

The observation object included in the moving images can be detected based on the luminance difference. Therefore, by the feature amount calculation section calculating the luminance difference as the feature amount, the reference position calculation section can calculate the reference position using the feature amount.

The reference position calculation section may set a position where the luminance difference becomes maximum in the focus direction as the reference position.

The position where the luminance difference becomes maximum in the focus direction is a position most focused when picking up the moving images. Therefore, it becomes possible to grasp an arrangement of the observation object in the focus direction from that position. As a result, the position where the luminance difference becomes maximum in the focus direction can be used as the reference position.

The reference position calculation section may estimate the reference position based on a correlation of the luminance difference in the focus direction.

When a focal depth of an optical microscope used in picking up moving images is smaller than a thickness fluctuation of the observation object or an interval of the focal positions where the moving images are picked up is smaller than the thickness fluctuation of the observation object, resolution becomes insufficient if a maximum value of the luminance difference is used in calculating the reference position. Even in such a case, the reference position calculation section can estimate the reference position using the correlation of the luminance differences.

The analysis system may further include a result presentment section that quantifies and images a movement in the focus direction based on a temporal fluctuation of the reference position.

With this structure, since the movement of the observation object in the focus direction becomes visible, a user can visually grasp the state of the observation object.

To attain the object described above, according to an embodiment of the present technique, there is provided an analysis program including a feature amount calculation section and a reference position calculation section.

The feature amount calculation section calculates a feature amount in each of a plurality of moving images of a sample including an observation object, that have been captured at different focal positions, the plurality of moving images having the same phase of movements.

The reference position calculation section calculates a reference position of the observation object in a focus direction based on the feature amount.

To attain the object described above, according to an embodiment of the present technique, there is provided an analysis method including calculating, by a feature amount calculation section, a feature amount in each of a plurality of moving images of a sample including an observation object, that have been captured at different focal positions, the plurality of moving images having the same phase of movements.

A reference position calculation section calculates a reference position of the observation object in a focus direction based on the feature amount.

Effects of the Invention

As described above, according to the present technique, an analysis system, an analysis program, and an analysis method suited for analyzing a 3-dimensional temporal change of an observation object can be provided.

It should be noted that the effects described herein are not necessarily limited, and any effect described in the present disclosure may be obtained.

MODE FOR CARRYING OUT THE INVENTION

[Structure and Operation of Analysis System]

Figure 1:
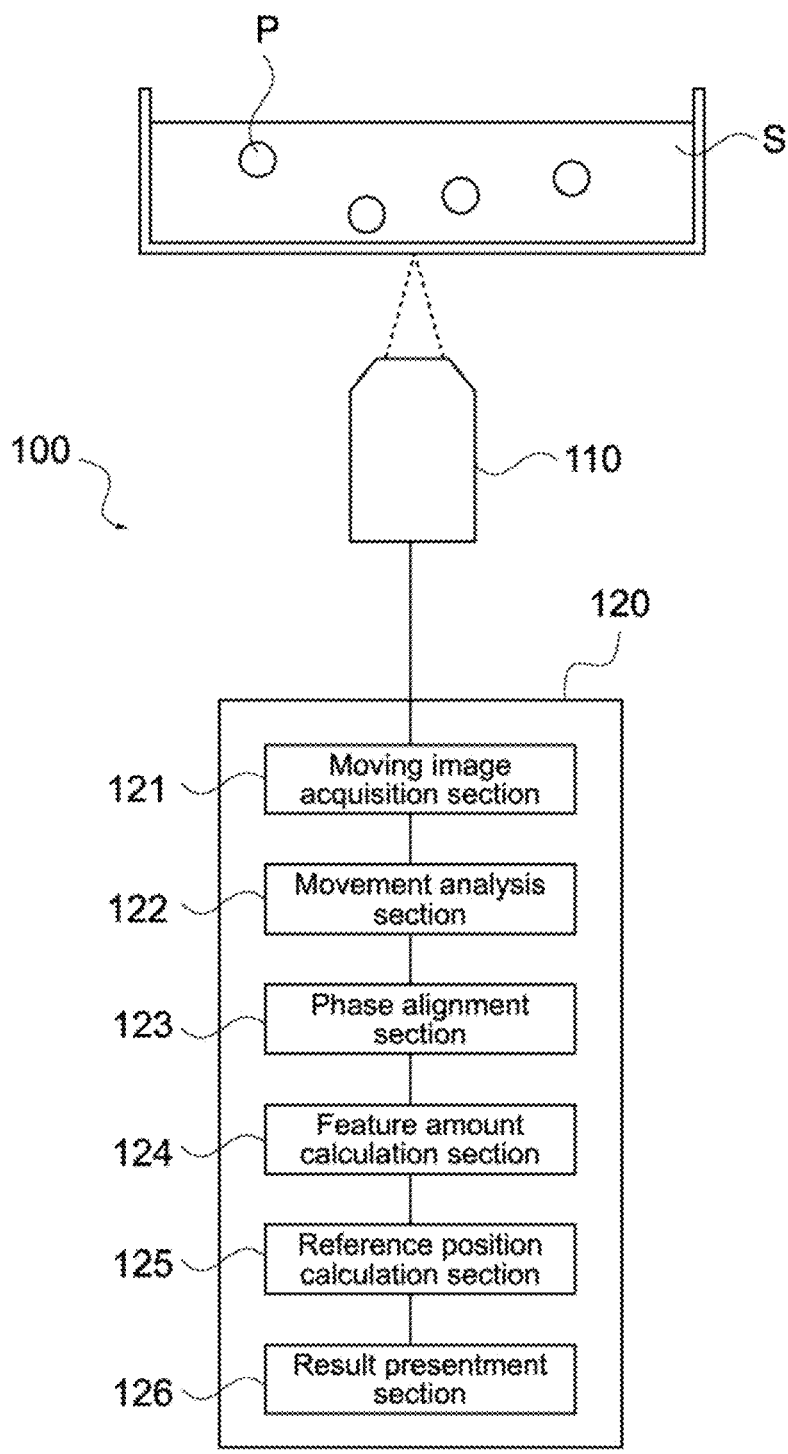
[FIG. 1] A schematic diagram showing a structure of an analysis system according to an embodiment of the present technique.

The analysis system according to an embodiment of the present technique will be described. FIG. 1 is a schematic diagram showing a structure of the analysis system 100 according to this embodiment.

As shown in the figure, the analysis system 100 includes a moving image pickup section 110 and an image processing unit 120. The moving image pickup section 110 may be an optical microscope such as a bright field microscope and a phase contrast microscope, and the image processing unit 120 may be an information processing apparatus such as a personal computer. It should be noted that the image processing unit 120 may be integrally formed with the moving image pickup section 110.

FIG. 1 shows an observation sample S. The observation sample S is not particularly limited and may be obtained by accommodating cells in a culture solution. For example, 3D-cultivated cardiac myocytes may be used. Hereinafter, such cells are an observation object and will be referred to as observation object P. Although details will be given later, the analysis system 100 analyzes the observation object P using regular movements (pulses etc.) of the observation object P. Therefore, cells having regular movements (including cell group) and body tissues can be targeted as the observation object P of the analysis system 100.

Figure 2:
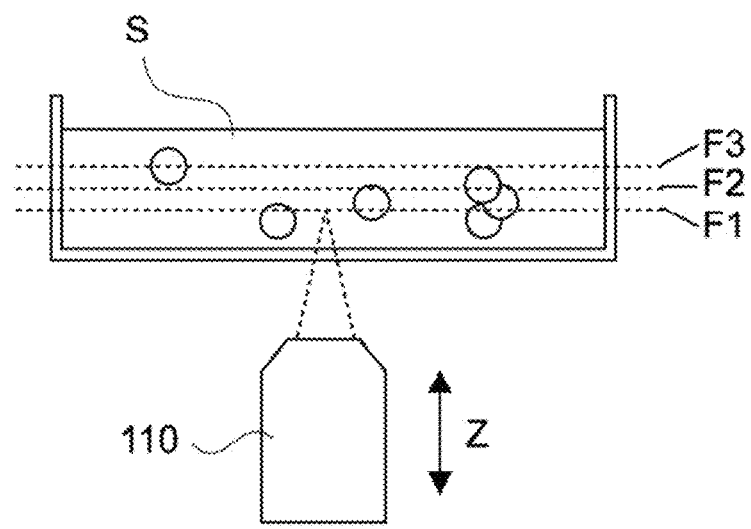
[FIG. 2] A schematic diagram showing an image pickup state of an observation sample captured by a moving image pickup section of the analysis system.

The moving image pickup section 110 captures images of the observation sample S to generate a plurality of moving images. The moving image pickup section 110 includes at least a microscope optical system and an image pickup device such as a CCD (Charge Couple Device) image sensor and captures moving images of the observation sample S via the microscope optical system. Here, the moving image pickup section 110 is capable of changing a focal position (position of focal plane on observation sample S) to capture a moving image. FIG. 2 is a schematic diagram showing the focal positions at which moving images are captured by the moving image pickup section 110.

As shown in the figure, the moving image pickup section 110 captures images of the observation sample S at a plurality of focal positions (e.g., focal positions F1 to F3). In the descriptions below, a focus direction (optical-axis direction of microscope optical system) is referred to as Z direction, a direction orthogonal to the Z direction is referred to as X direction, and a direction orthogonal to the Z and X directions will be referred to as Y direction. The number of focal positions to capture moving images is not particularly limited and can be changed as appropriate according to the size of the observation object P and the like. It is favorable for the intervals of the focal positions to be regular intervals, such as intervals of several μm. It should be noted that the intervals of the focal positions are smaller the better for improving accuracy of calculating a reference Z position to be described later. Moreover, the intervals of the focal positions are important even when equal to or smaller than the resolution of the microscope optical system. For example, even when the intervals of the focal positions are 1 μm in the case where the resolution of the microscope optical system is 2 μm, accuracy is improved.

The moving image pickup section 110 captures a moving image for a certain time at one focal position and then captures, after moving the focal position in the Z direction, a moving image again for a certain time. The moving image pickup section 110 repeats this for a predetermined number of times. In other words, the moving images captured at the respective focal positions (hereinafter, referred to as pickup moving images) are moving images captured at different times. It should be noted that it is possible for the moving image pickup section 110 to move the focal position in only the focus direction (Z direction) and not move it in other directions (X and Y directions).

Figure 3:
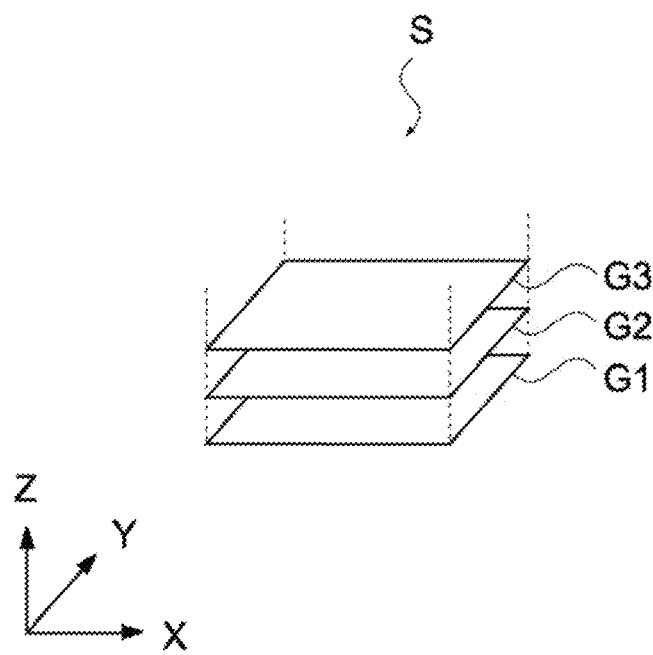
[FIG. 3] A schematic diagram showing a positional relationship among moving images captured by the moving image pickup section of the analysis system.
Figure 4:
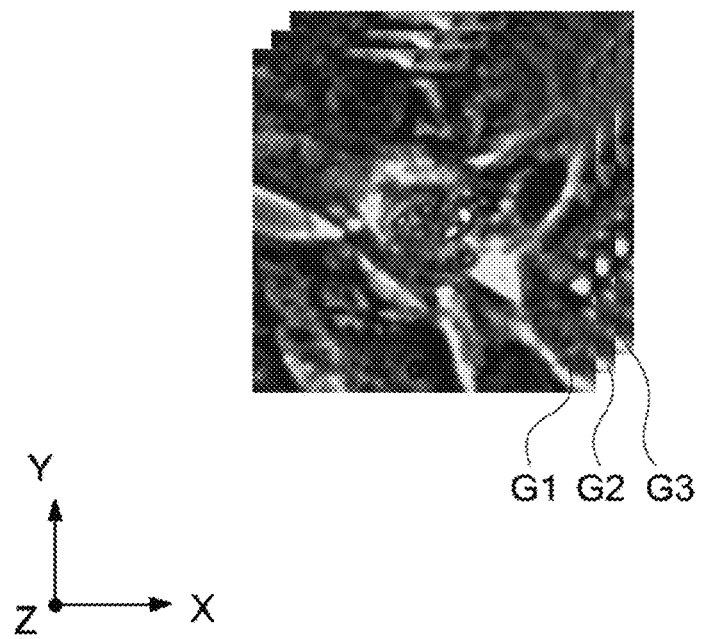
[FIG. 4] An example of moving images captured by the moving image pickup section of the analysis system.

FIG. 3 is a schematic diagram showing a positional relationship among pickup moving images, the diagram showing pickup moving images G1 to G3 captured at the focal positions F1 to F3, respectively. As shown in the figure, pickup moving images are captured at a plurality of focal positions in the same area (area where X-Y coordinates are the same) of the observation sample S. Specifically, the pickup moving images are Z-stack moving images. The number of pickup moving images is not particularly limited and can be changed as appropriate according to the size of the observation object P and the like. FIG. 4 is an example of the pickup moving images G1 to G3. The moving image pickup section 110 outputs the pickup moving images and the focal positions thereof to the image processing unit 120.

Figure 5:
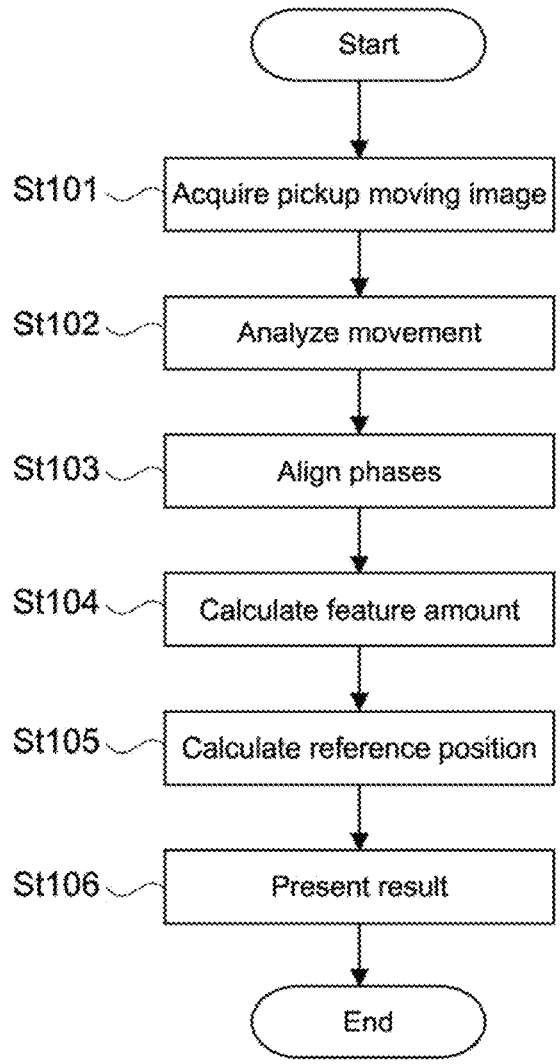
[FIG. 5] A flowchart showing operations of the analysis system.

As shown in FIG. 1, the image processing unit 120 includes a moving image acquisition section 121, a movement analysis section 122, a phase alignment section 123, a feature amount calculation section 124, a reference position calculation section 125, and a result presentment section 126. These structures are functional structures realized by hardware and software cooperating with each other. FIG. 5 is a flowchart showing operations of the image processing unit 120.

The moving image acquisition section 121 acquires a plurality of pickup moving images captured at different focal positions by the moving image pickup section 110 (St101). At this time, the moving image acquisition section 121 acquires the focal positions where the pickup moving images have been captured, together with the pickup moving images. The moving image acquisition section 121 may also acquire pickup moving images via a network or a storage. The moving image acquisition section 121 supplies the plurality of pickup moving images and the focal positions where the pickup moving images have been captured to the movement analysis section 122.

The movement analysis section 122 analyzes movements in the pickup moving images (St102). Specifically, the movement analysis section 122 calculates a movement vector in the X-Y direction for each pixel in each of the pickup moving images or for each pixel group including a plurality of pixels. The movement vector can be calculated by, for example, block matching. The movement analysis section 122 analyzes movements in the pickup moving images from movement amounts and movement velocities of the calculated movement vectors.

Figure 6:
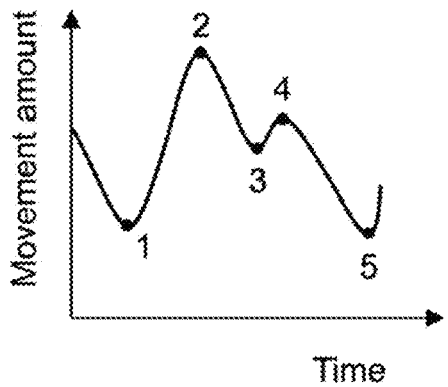
[FIG. 6] A schematic diagram showing an analysis result obtained by a movement analysis section of the analysis system.

FIG. 6 is a graph showing an example of a movement analysis result with respect to a pickup moving image. Since the observation object P causes regular movements (pulses) as described above, a regularity of the movement of the observation object P included in each pickup moving image appears in the analysis result. The movement analysis section 122 extracts characteristic points in the movement as pulse timings (numbers in figure). The characteristic points may be, for example, a local maximum point and a local minimum point of a movement amount as shown in FIG. 6.

In the descriptions below, pulse timings 1 to 5 shown in FIG. 6 will be used. The number of pulse timings is not particularly limited. When the observation object P is a cardiac myocyte, for example, the movement analysis section 122 extracts 5 pulse timings. In addition, the movement analysis section 122 can determine the pulse timings based on the type of observation object P (type of pulses).

Figure 7:
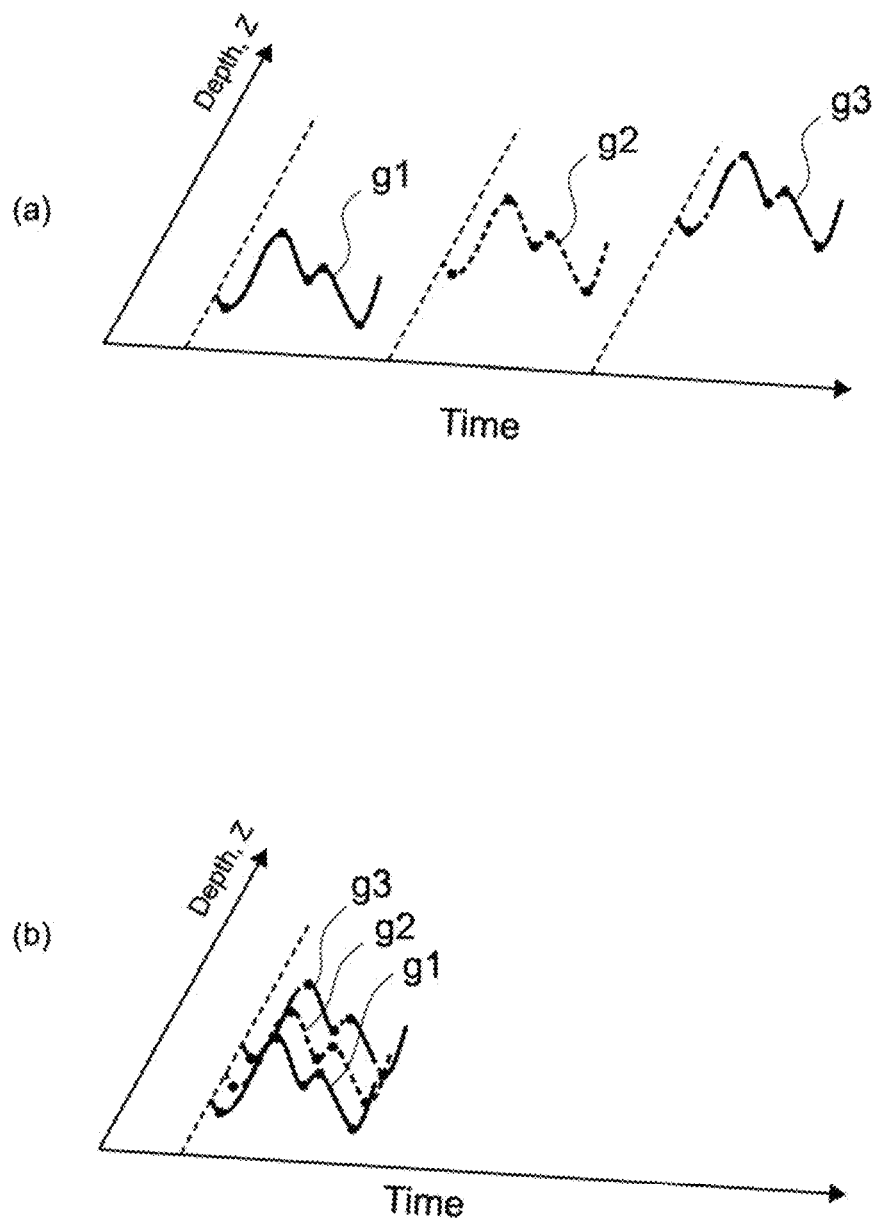
[FIG. 7] Schematic diagrams showing phase alignment by a phase alignment section of the analysis system.

The phase alignment section 123 uses the movement analysis result obtained by the movement analysis section 122 to align phases of the pickup moving images (St103). FIG. 7 are schematic diagrams showing phase alignment by the phase alignment section 123, the diagrams showing movements g1 to g3 calculated from the pickup moving images G1 to G3. As described above, the moving image pickup section 110 captures a moving image for a certain time at each of the focal positions. Therefore, image pickup times of the pickup moving images (extraction times of movements g1 to g3) captured at the respective focal positions differ as shown in FIG. 7A.

Here, the phase alignment section 123 aligns phases of the pickup moving images using the pulse timings as shown in FIG. 7B. Specifically, the moving image pickup section 110 aligns timings of the pickup moving images such that the pulse timings of one pickup moving image coincides with those of another pickup moving image. The phase alignment section 123 supplies the plurality of pickup moving images having matched phases to the feature amount calculation section 124.

Figure 8:
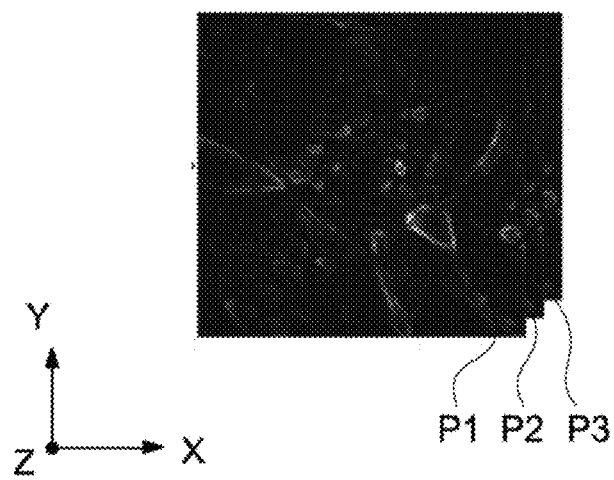
[FIG. 8] An example of a moving image expressing feature amounts calculated by a feature amount calculation section of the analysis system.

The feature amount calculation section 124 calculates a feature amount in each of the pickup moving images (St104). The feature amount is an amount that expresses a feature of a moving image and is, for example, a luminance difference (luminance difference from adjacent pixel or peripheral pixel). FIG. 8 shows luminance difference moving images P1 to P3 obtained as the luminance difference calculation result by the feature amount calculation section 124. The luminance difference moving images P1 to P3 are moving images of luminance differences respectively calculated from the pickup moving images G1 to G3. The pickup moving images G1 to G3 are moving images, so the luminance differences also fluctuate with time.

The calculation of a luminance difference is also called contrast method, and it is possible to detect a part having a high contrast in a pickup moving image. As shown in the figure, the feature amount calculation section 124 calculates a feature amount from each of the pickup moving images. It should be noted that the feature amount calculation section 124 may calculate a feature amount excluding a luminance difference or calculate a plurality of types of feature amounts from one pickup moving image.

Figure 9:
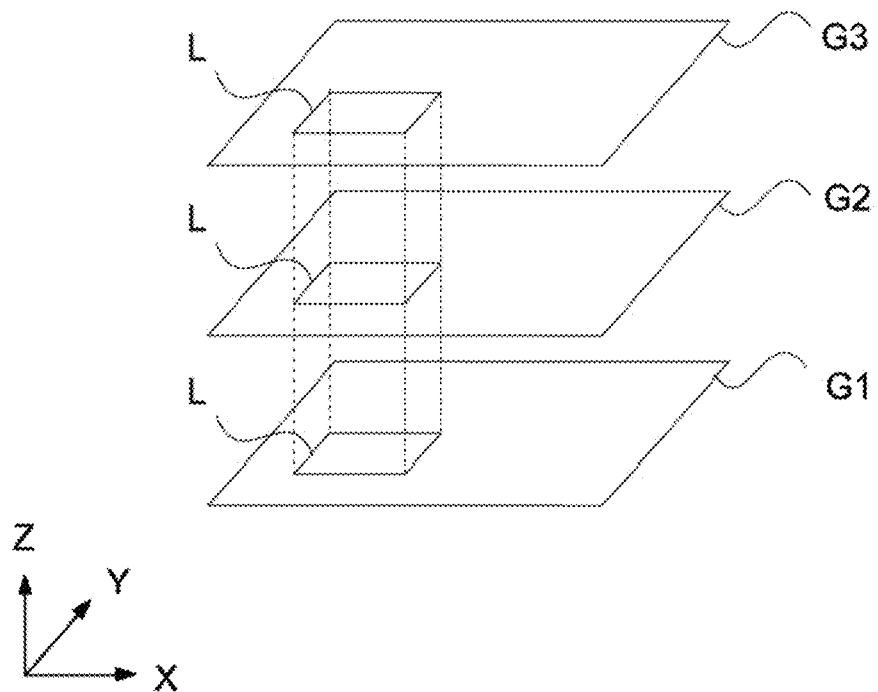
[FIG. 9] A schematic diagram showing a positional relationship among calculation areas set by a reference position calculation section of the analysis system.

The reference position calculation section 125 calculates a reference position of the observation object in the Z direction (St105). Specifically, the reference position calculation section 125 designates a calculation area in each of the pickup moving images. FIG. 9 is a schematic diagram showing a calculation area L designated in the pickup moving images G1 to G3. As shown in the figure, the reference position calculation section 125 sets the calculation area L in a predetermined area of each of the pickup moving images G1 to G3.

Figure 10:
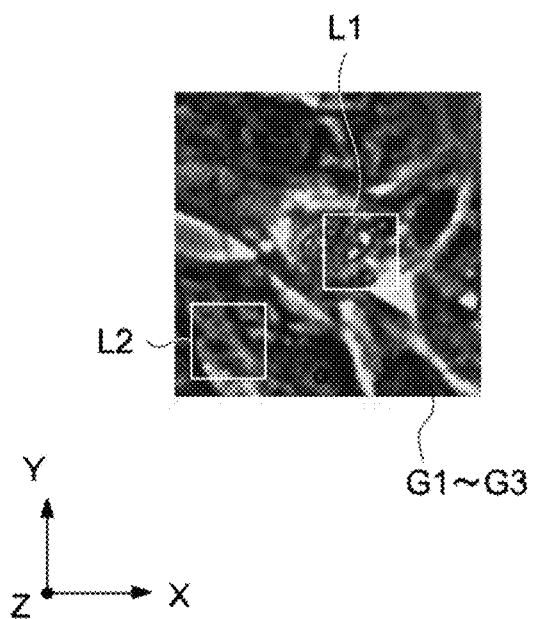
[FIG. 10] A schematic diagram showing calculation areas set by the reference position calculation section of the analysis system.

Here, as shown in the figure, the reference position calculation section 125 sets the calculation area L in the same area of the pickup moving images in the Z direction (areas having same X and Y coordinates). It should be noted that the reference position calculation section 125 may set a plurality of calculation areas L in each pickup moving image or set the entire pickup moving image as one calculation area L. FIG. 10 shows calculation areas L1 and L2 set in the pickup moving images G1 to G3. It should be noted that an image pickup magnification of FIG. 10 is 20 folds by an objective lens. The calculation area L1 is an area including a center portion of a cell body of a cardiac myocyte (observation object P), and the calculation area L2 is an area including a circumferential portion of the cell body.

Figure 11:
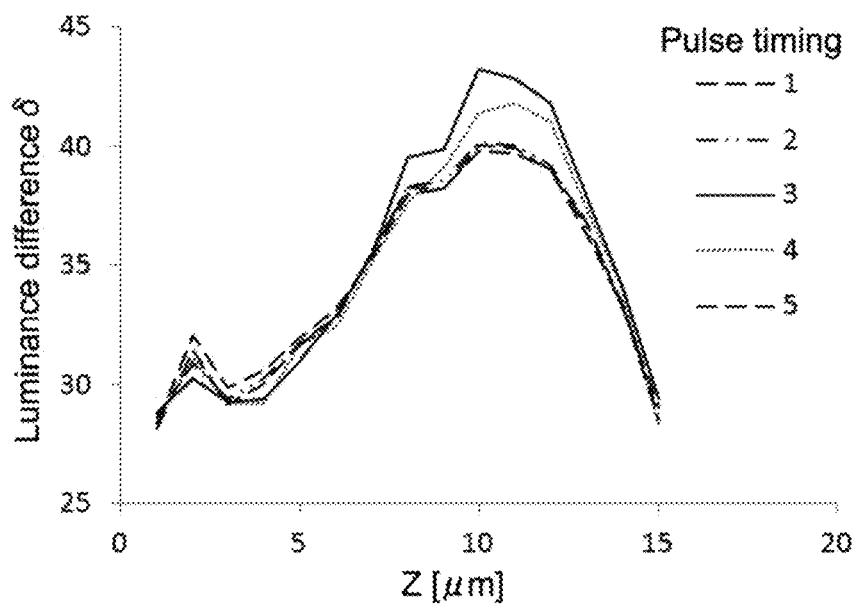
[FIG. 11] A graph showing, for each pulse timing, a luminance difference in one calculation area, that has been calculated by the feature amount calculation section of the analysis system.
Figure 12:
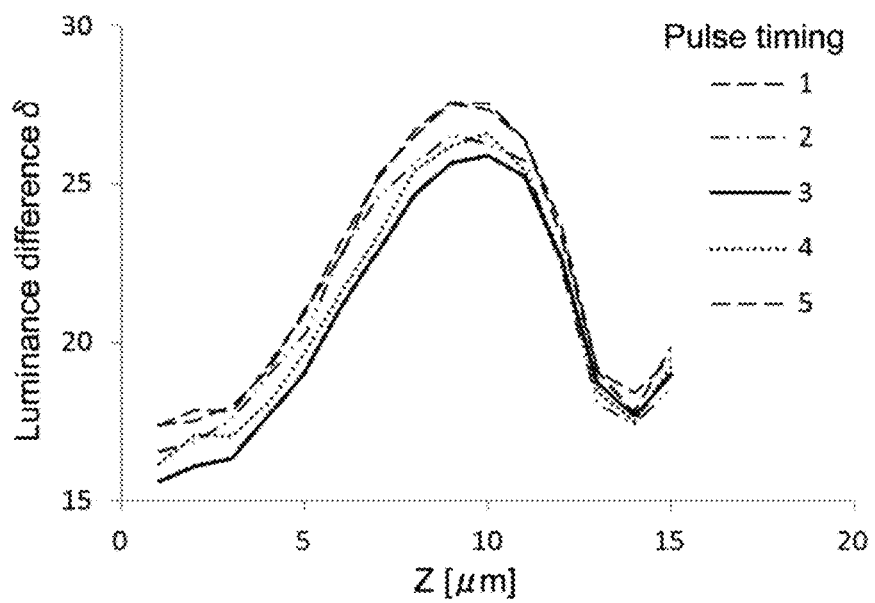
[FIG. 12] A graph showing, for each pulse timing, a luminance difference in another calculation area, that has been calculated by the feature amount calculation section of the analysis system.

The reference position calculation section 125 uses the feature amount calculated from the moving image area, that is included in the calculation area L, to obtain a "reference Z position" for each of the set calculation areas L. FIG. 11 is a graph showing, for each pulse timing, a luminance difference in the calculation area L1. The abscissa axis of the graph represents a Z position, that is, a focal position where a pickup moving image has been captured. A smaller value of the Z position indicates a lower side (shallower focal position) of the observation object P (see FIG. 2). FIG. 12 is a graph showing, for each pulse timing, a luminance difference in the calculation area L2. The reference position calculation section 125 obtains the reference Z position from the feature amounts of the calculation areas as shown in FIGS. 11 and 12.

Figure 13:
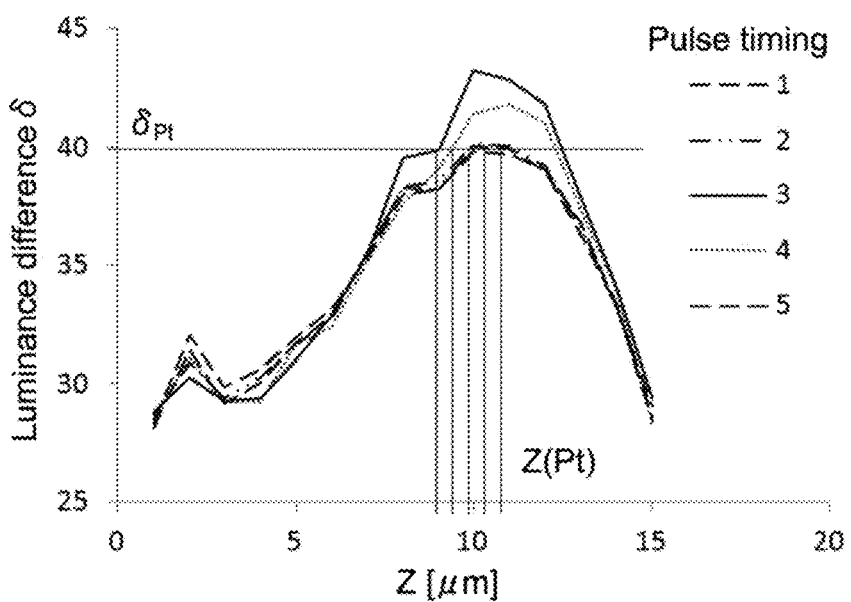
[FIG. 13] A schematic diagram showing a reference position calculation method for the reference position calculation section of the analysis system.

Specifically, the reference position calculation section 125 can set the Z position where the luminance difference becomes maximum in each calculation area as the reference Z position. FIG. 13 is a diagram showing the reference Z position in the graph shown in FIG. 11. The reference position calculation section 125 averages the luminance differences for each of the calculation areas (low-pass filter) and calculates the Z position where the luminance difference becomes maximum to obtain the reference Z position. The reference position calculation section 125 may also estimate the Z position from the luminance difference value. The estimation of the Z position will be described later.

Figure 14:
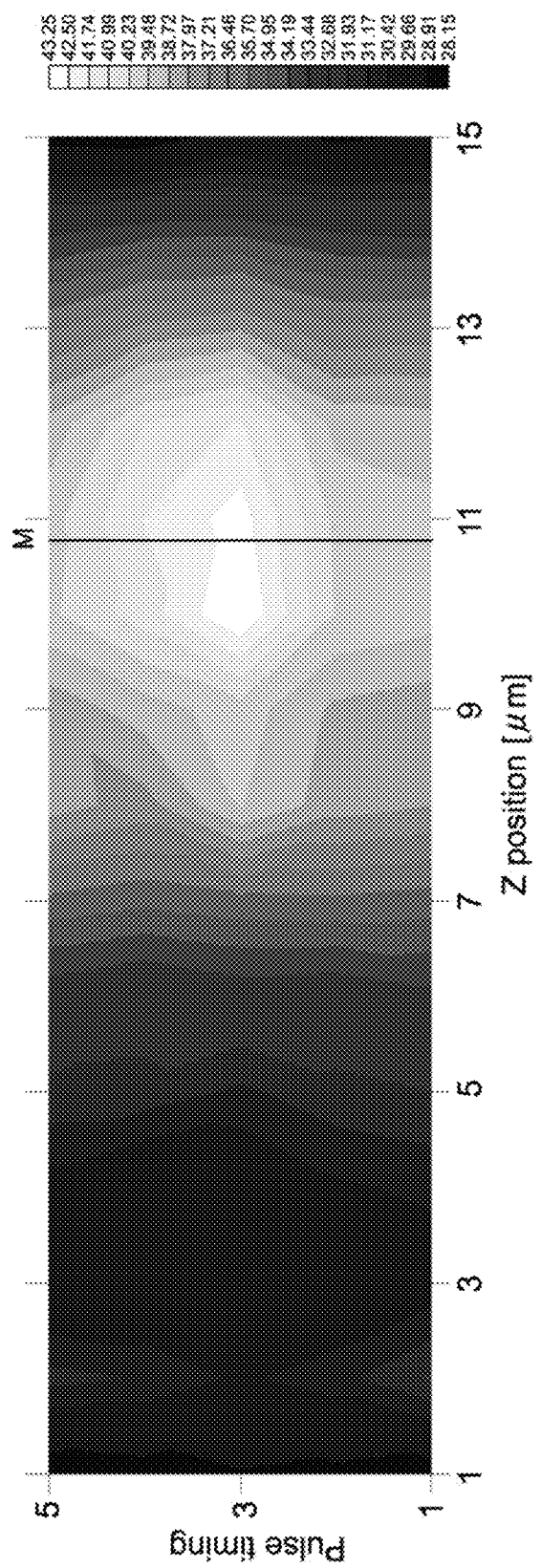
[FIG. 14] A graph showing a reference position in one calculation area, that has been calculated by the reference position calculation section of the analysis system.
Figure 15:
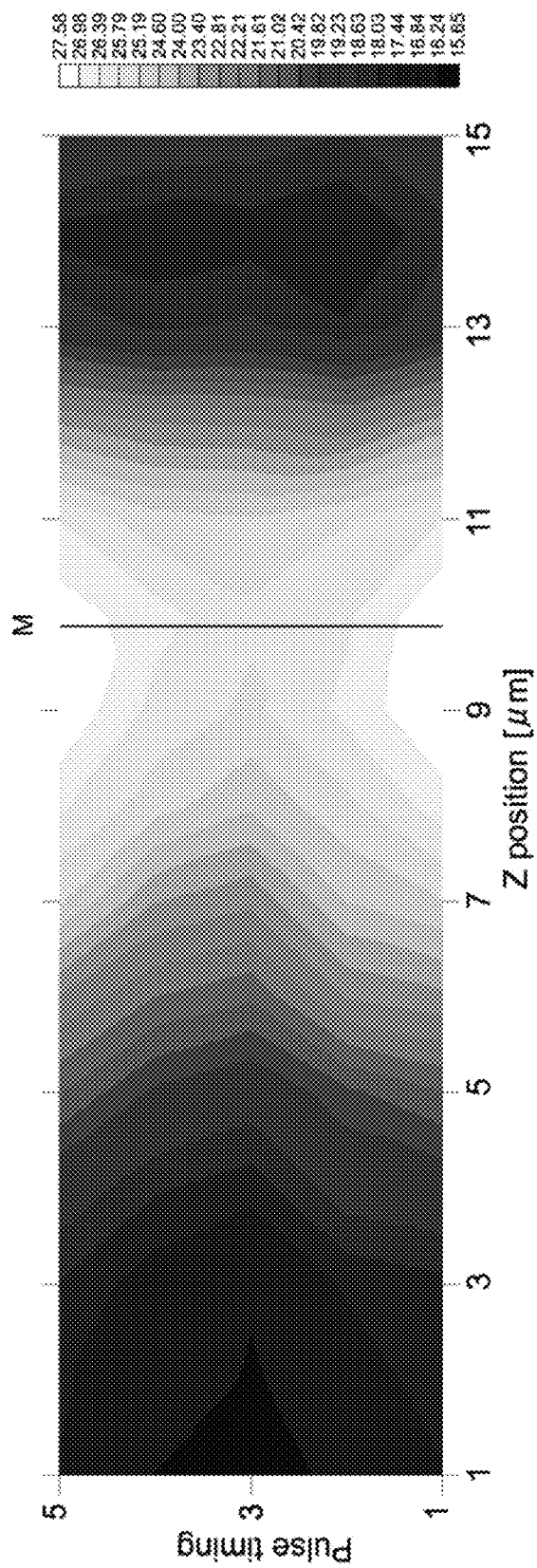
[FIG. 15] A graph showing a reference position in another calculation area, that has been calculated by the reference position calculation section of the analysis system.

FIG. 14 is a graph showing the luminance difference in the calculation area L1 in grayscale, with respect to the pulse timing and the Z position. FIG. 15 is a graph showing the luminance difference in the calculation area L2 in grayscale, with respect to the pulse timing and the Z position. In FIGS. 14 and 15, the reference Z position is indicated by a line M.

Comparing FIGS. 14 and 15, the reference Z position of the calculation area L1 is at a Z position deeper than the reference Z position of the calculation area L2. Further, regarding the luminance differences of the calculation areas L1 and L2, the tendency of a luminance difference based on a pulse timing differs. In the calculation area L1, the luminance differences at the pulse timings 1 and 5 are small, and the luminance difference at the pulse timing 3 is the largest. In contrast, in the calculation area L2, the luminance differences at the pulse timings 1 and 5 are large, and the luminance difference at the pulse timing 3 is the smallest. This also appears as a difference in the area shape in FIGS. 14 and 15.

Figure 16:
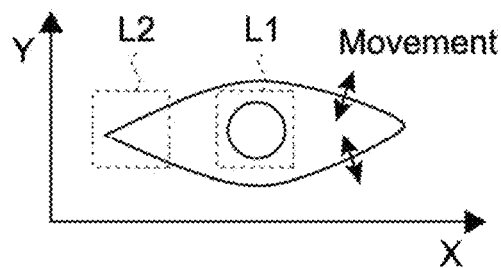
[FIG. 16] A schematic diagram showing a positional relationship between the calculation area and the observation object.
Figure 16:
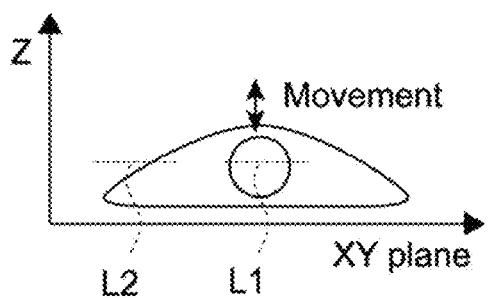

FIG. 16 is a schematic diagram showing the movements of the observation object P. As shown in FIGS. 11 and 12, at the pulse timings 2 and 3, the luminance difference of the calculation area L1 becomes large, and the luminance difference of the calculation area L2 becomes small. This is considered to be because the contrast is lowered due to the contrast becoming higher by the center portion of the observation object P (corresponding to calculation area L1) bulging and, on the other hand, the peripheral portion of the observation object P (corresponding to calculation area L2) being pulled to be thinned. Moreover, regarding the movements, it is considered that the observation object P moves about the reference Z position in the Z direction.

The movement of the observation object P in the Z direction as described above can be seen as a difference in the reference Z position as shown in FIGS. 14 and 15. Specifically, it is possible to quantifiably grasp the movement of the observation object P in the Z direction by the reference position calculation section 125 calculating the reference Z position. The reference position calculation section 125 can record the temporal changes of the reference Z position to quantify the changes in the movement in the Z direction. The reference position calculation section 125 can also quantify the changes in the movement in the Z direction by following locations having the same luminance in the Z direction. The reference position calculation section 125 supplies the reference Z position and the quantification result to the result presentment section 126.

Figure 17:
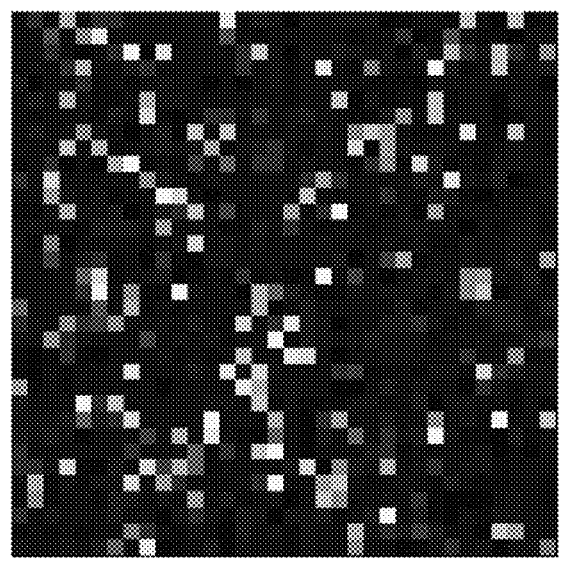
[FIG. 17] An example of a result presentment image presented by a result presentment section of the analysis system.

The result presentment section 126 quantifies the movement of the observation object P in the Z direction to generate an image and presents the image to a user (St106). Specifically, the result presentment section 126 can superimpose, for each area into which a pickup moving image is divided, the quantified movements in the Z direction and generate a result presentment image. FIG. 17 is an example of the result presentment image. In the result presentment image shown in the figure, an area with a +movement in the Z direction is indicated in white, and an area with a −movement in the Z direction is indicated in black. Accordingly, it becomes possible to visualize, for example, a difference in the movement direction in the Z direction between the center portion and circumferential portion of the cell at each pulse timing.

Figure 18:
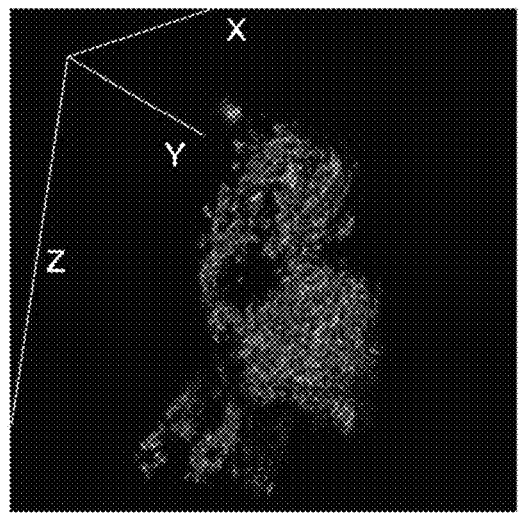
[FIG. 18] An example of a result presentment image presented by the result presentment section of the analysis system.

The result presentment section 126 may also present the feature amount calculated by the feature amount calculation section 124. In FIG. 18, the luminance differences calculated from the pickup moving images are arranged in the XYZ directions along the XYZ coordinates of the pickup moving images. Accordingly, the result presentment section 126 can sterically present the feature amounts.

The analysis system 100 performs the operations as described above. By the phase alignment section 123 aligning the phases of the pickup moving images using the pulse timings of the pickup moving images, it becomes possible to obtain information on the movement of the observation object P in the Z direction from the pickup moving images captured at difference focal positions. Further, by the reference position calculation section 125 calculating the reference Z position, the movement of the observation object P in the Z direction can be evaluated quantifiably. Therefore, the analysis system 100 is suited for analyzing a 3-dimensional temporal state of the observation object P. In addition, since the analysis system 100 can perform a quantitative evaluation of the Z direction by the image processing on the pickup moving images and there is no need to irradiate laser and the like, the analysis system 100 can perform an analysis without inhibiting the physiological state of the observation object P.

[Application to Colony-Like Cells]

In the descriptions above on the analysis system 100, a difference in the movements in the Z direction between the center portion and circumferential portion of a cell has been exemplified. However, the analysis system 100 is also applicable to colony-like cells.

Figure 19:
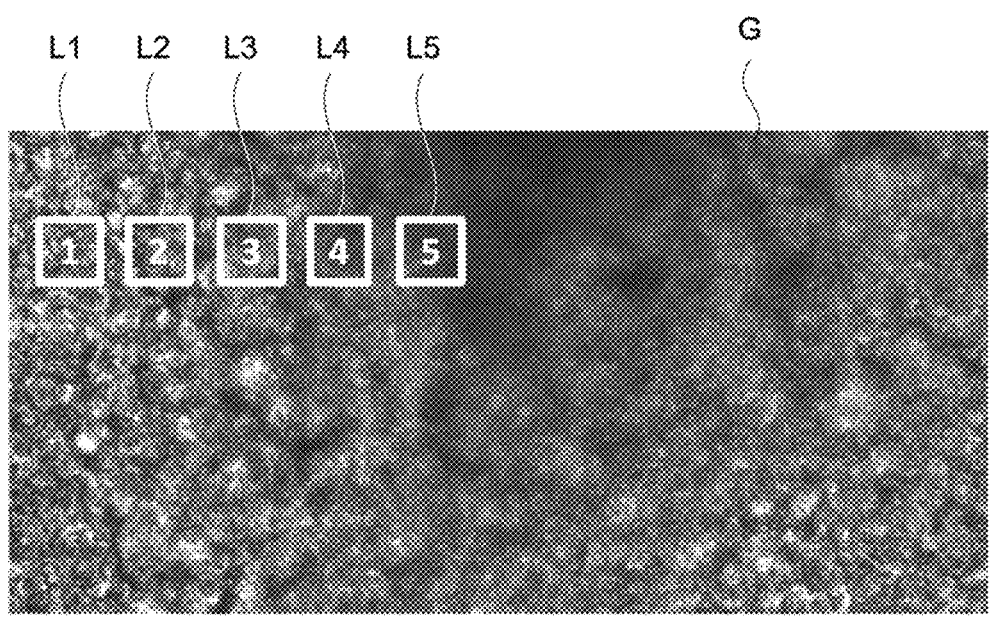
[FIG. 19] An example of a moving image captured by the moving image pickup section of the analysis system.

FIG. 19 shows a pickup moving image G obtained by capturing colony-like cardiac myocytes. As described above, the pickup moving image G is a moving image captured at a plurality of focal positions, and FIG. 19 shows one of the moving images. As described above, the moving image acquisition section 121 acquires a plurality of moving images including the pickup moving image G, and the movement analysis section 122 and the phase alignment section 123 align phases of the pickup moving images. The feature amount calculation section 124 calculates feature amounts of the pickup moving images.

The reference position calculation section 125 sets a calculation area in the pickup moving image G. FIG. 19 shows calculation areas L1 to L5. Each calculation area may include a plurality of cells forming a colony. The reference position calculation section 125 obtains, for each of the calculation areas, the reference Z position using the feature amounts calculated from pixels included in the calculation areas.

When a larger one of the focal depth of the objective lens of the moving image pickup section 110 and the focal interval (see FIG. 2) is smaller than the thickness fluctuation of the observation object P, the reference position calculation section 125 can calculate a luminance difference maximum value. On the other hand, when a larger one of the focal depth of the objective lens of the moving image pickup section 110 and the focal interval (see FIG. 2) is larger than the thickness fluctuation of the observation object P, the reference position calculation section 125 lacks resolution.

In this case, the reference position calculation section 125 can estimate the luminance difference maximum value. For example, in the case where the focal depth of the objective lens is 3.35 µm and the focal interval is 4 µm, the luminance difference maximum value can be calculated when the thickness fluctuation is 4 µm or more. Otherwise, the luminance difference maximum value needs to be estimated.

Figure 20:
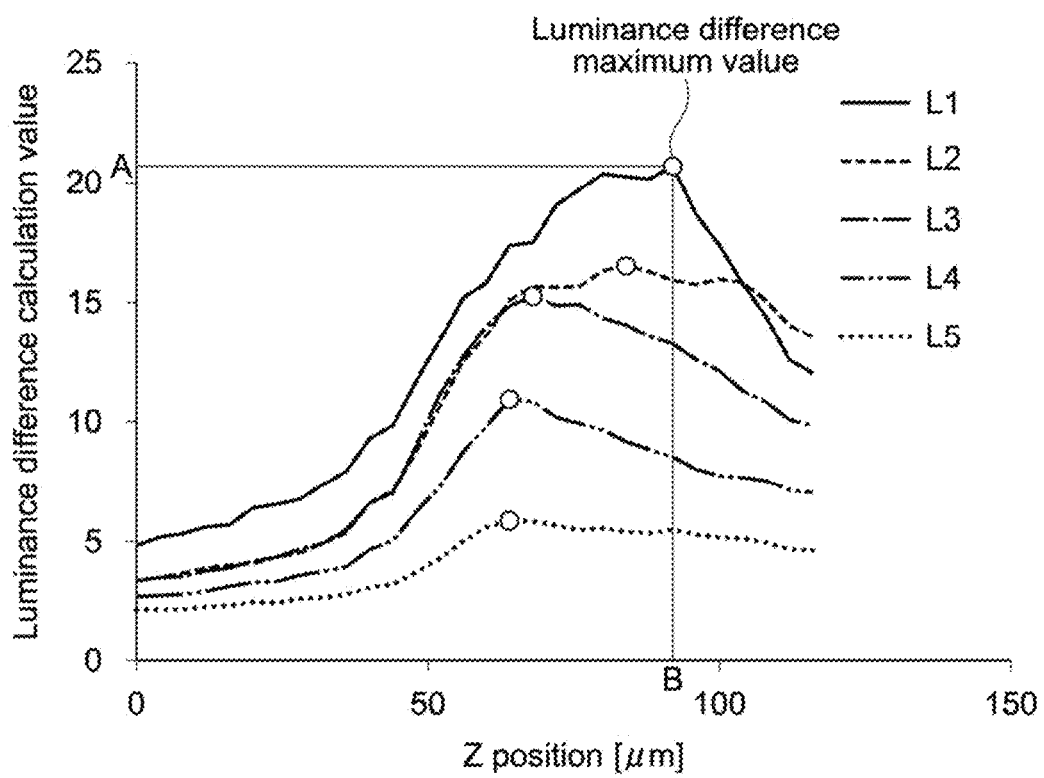
[FIG. 20] A graph showing feature amounts in the calculation areas, that have been calculated by the feature amount calculation section of the analysis system.

FIG. 20 is a graph showing the luminance differences of the calculation areas L1 to L5 at the pulse timing 1. The luminance difference maximum values of the calculation areas L1 to L5 are indicated by white circles. The reference position calculation section 125 sets a Z position where the luminance difference becomes maximum in the calculation areas L1 to L5 as the reference Z position of the calculation areas. It should be noted that in the figure, the luminance difference maximum value and reference Z position of the calculation area L1 are respectively indicated by A and B. The same holds true for other calculation areas L.

Figure 21:
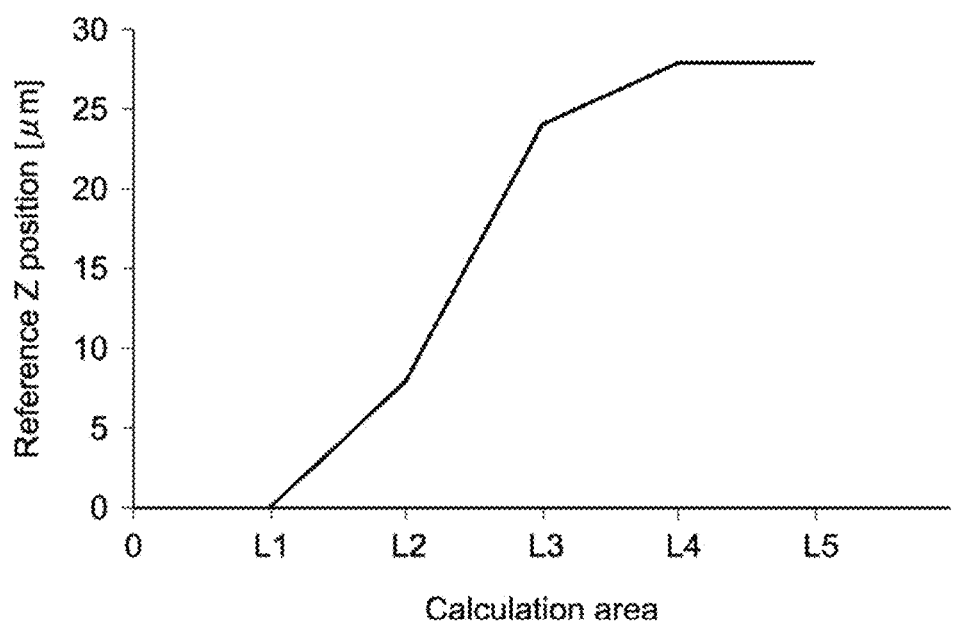
[FIG. 21] A graph showing the reference position in the calculation areas, that has been calculated by the reference position calculation section of the analysis system.

FIG. 21 is a graph showing the reference Z position shown in FIG. 20 for each of the calculation areas. The ordinate axis represents the reference Z position (B of FIG. 20). It can be seen that there is a difference of 30 µm between the reference Z position of the calculation area L1 and that of the calculation area L5.

Figure 22:
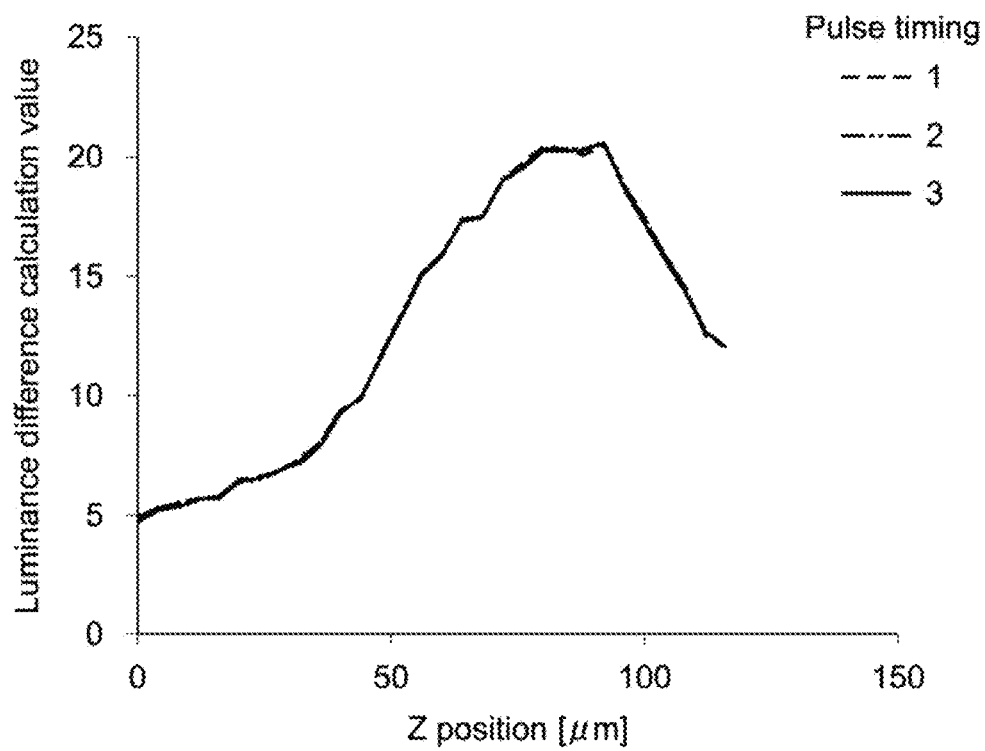
[FIG. 22] A graph showing feature amounts in one calculation area, that have been calculated by the feature amount calculation section of the analysis system.
Figure 23:
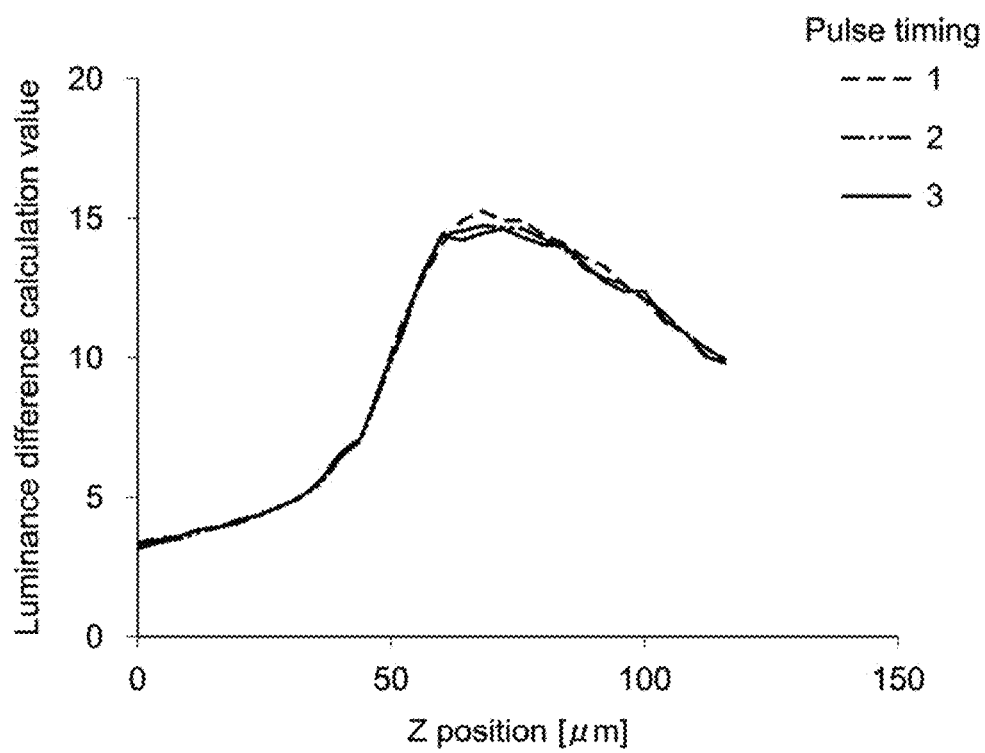
[FIG. 23] A graph showing feature amounts in another calculation area, that have been calculated by the feature amount calculation section of the analysis system.

The reference position calculation section 125 is also capable of calculating a thickness fluctuation (fluctuation in Z direction) due to pulses of the observation object P. FIG. 22 shows the luminance differences at the pulse timings 1 to 3 in the calculation area L1, and FIG. 23 shows the luminance differences at the pulse timings 1 to 3 in the calculation area L3. While the luminance differences at the pulse timings hardly differ in the calculation area L1, the luminance differences at the pulse timings differ in the calculation area L3. This is considered to be because the movement of the observation object P in the Z direction in the calculation area L3 is larger than that in the calculation area L1.

However, since the difference in the luminance differences at the pulse timings is small, it is difficult to calculate a maximum value.

Figure 24:
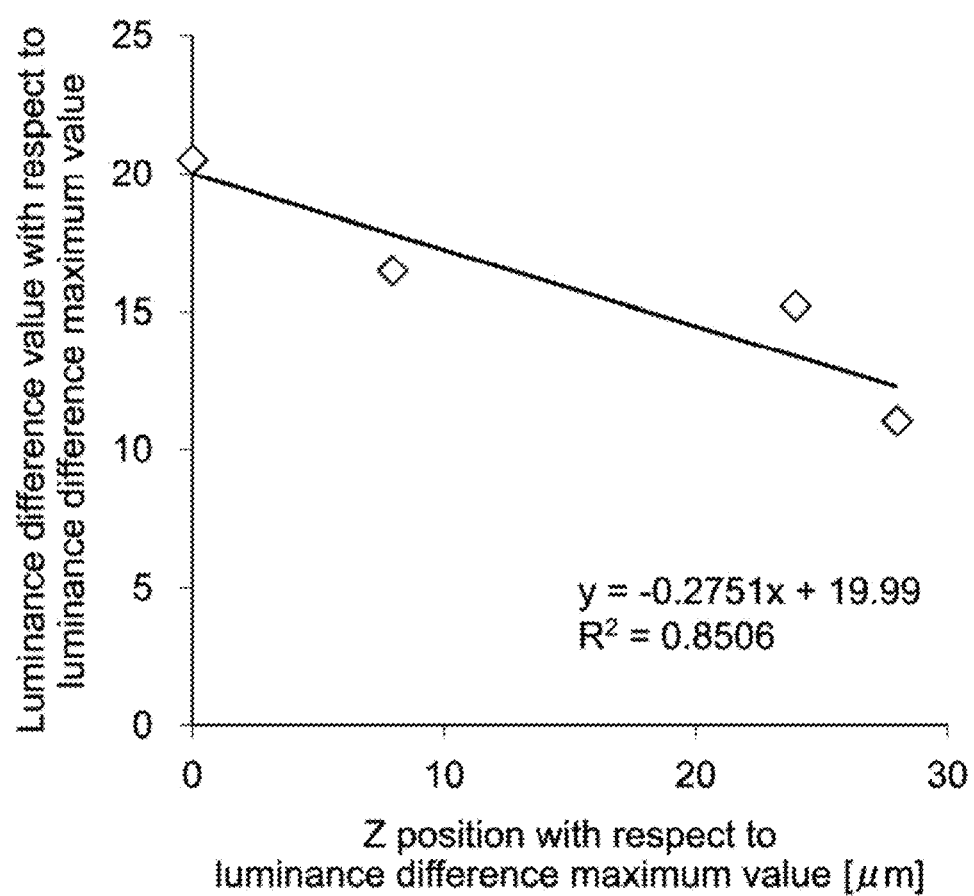
[FIG. 24] A graph showing a reference position estimation method for the reference position calculation section of the analysis system.

In this case, the reference position calculation section 125 can estimate the reference Z position from the luminance difference value itself instead of the luminance difference maximum value. FIG. 24 is a graph showing the estimation of the reference Z position based on a luminance difference value. As shown in the figure, the reference position calculation section 125 can directly estimate the reference Z position from the Z position where the luminance difference becomes maximum (abscissa axis, B in FIG. 20) and the luminance difference value in the area correlated to the luminance difference maximum value (ordinate axis, A in FIG. 20) (calculation areas L1 to L4).

[Pickup Moving Image]

As described above, the feature amount calculation section 124 calculates feature amounts of pickup moving images phase-aligned by the phase alignment section 123. However, the pickup moving images only need to have aligned phases, and the phases thereof do not necessarily need to be aligned by the phase alignment section 123.

In other words, if the pulse timings of the observation object P are known in advance, it is possible to generate pickup moving images having aligned phases by the moving image pickup section 110 capturing moving images at different focal points at those pulse timings. Moreover, pickup moving images having aligned phases may also be generated by cutting out frames according to the pulse timings out of the pickup moving images captured within an arbitrary image pickup time. In either case, the present technique is applicable as long as the phases of the pickup moving images are aligned.

It should be noted that the present technique may also take the following structures.

(1) An analysis system, including:
a feature amount calculation section that calculates a feature amount in each of a plurality of moving images of a sample including an observation object, that have been captured at different focal positions, the plurality of moving images having the same phase of movements; and
a reference position calculation section that calculates a reference position of the observation object in a focus direction based on the feature amount.

(2) The analysis system according to (1), further including:
a movement analysis section that analyzes a movement in each of the plurality of moving images; and
a phase alignment section that aligns phases of the plurality of moving images using a movement analysis result obtained by the movement analysis section.

(3) The analysis system according to (1) or (2), in which:
the movement analysis section extracts pulse timings attributed to a pulse of the observation object in each of the plurality of moving images; and
the phase alignment section aligns the phases of the plurality of moving images so that the pulse timings match among the plurality of moving images.

(4) The analysis system according to any one of (1) to (3), in which:
the feature amount is a luminance difference; and
the reference position calculation section calculates the reference position based on the luminance difference.

(5) The analysis system according to any one of (1) to (4), in which the reference position calculation section sets a position where the luminance difference becomes maximum in the focus direction as the reference position.

(6) The analysis system according to any one of (1) to (5), in which the reference position calculation section estimates the reference position based on a correlation of the luminance difference in the focus direction.

(7) The analysis system according to any one of (1) to (6), further including
a result presentment section that quantifies and images a movement in the focus direction based on a temporal fluctuation of the reference position.

(8) An analysis program, including:
a feature amount calculation section that calculates a feature amount in each of a plurality of moving images of a sample including an observation object, that have been captured at different focal positions, the plurality of moving images having the same phase of movements; and
a reference position calculation section that calculates a reference position of the observation object in a focus direction based on the feature amount.

(9) An analysis method, including:
calculating, by a feature amount calculation section, a feature amount in each of a plurality of moving images of a sample including an observation object, that have been captured at different focal positions, the plurality of moving images having the same phase of movements; and
calculating, by a reference position calculation section, a reference position of the observation object in a focus direction based on the feature amount.

DESCRIPTION OF REFERENCE NUMERALS

100 analysis system
110 moving image pickup section
120 image processing unit
121 moving image acquisition section
122 movement analysis section
123 phase alignment section
124 feature amount calculation section
125 reference position calculation section
126 result presentment section

The invention claimed is:

1. An analysis system, comprising:
a moving image pickup device configured to capture a plurality of moving images of a sample at a plurality of focal positions, wherein
each moving image of the plurality of moving images is captured for a specific time interval at a particular focal position of the plurality of focal positions, and
the sample includes an observation object; and
circuitry configured to:
calculate a feature amount in each of the plurality of moving images, wherein
a phase of movement of the observation object in a first moving image of the plurality of moving images is in alignment with a phase of the movement of the observation object in a second moving image of the plurality of moving images; and
calculate a reference position of the observation object in a focus direction, based on the feature amount.

2. The analysis system according to claim 1, wherein the circuitry is further configured to:
analyze the movement of the observation object in each of the plurality of moving images; and
align phases of the movement of the observation object in the plurality of moving images based on a result of the analysis of the movement of the observation object.

3. The analysis system according to claim 2, wherein the circuitry is further configured to:

extract a first plurality of pulse timings from the movement of the observation object in each of the plurality of moving images, wherein
  a pulse timing of the first plurality of pulse timings is attributed to a pulse from a plurality of pulses of the movement of the observation object; and
align the phases of the movement such that a second plurality of pulse timings of the movement of the observation object in the first moving image of the plurality of moving images matches with a third plurality of pulse timings of the movement of the observation object in the second moving image of the plurality of moving images.

4. The analysis system according to claim 1, wherein
the feature amount is a luminance difference and
the circuitry is further configured to calculate the reference position based on the luminance difference.

5. The analysis system according to claim 4, wherein
the circuitry is further configured to set the reference position based on the luminance difference that is maximum in the focus direction.

6. The analysis system according to claim 4, wherein
the circuitry is further configured to set the reference position based on a correlation of the luminance difference in the focus direction.

7. The analysis system according to claim 1, wherein
the circuitry is further configured to quantify the movement of the observation object in the focus direction based on a temporal fluctuation of the reference position, and
the movement of the observation object is quantified to generate an image.

8. A non-transitory computer-readable medium having stored thereon, computer-executable instructions, which when executed by a computer, cause the computer to execute operations, the operations comprising:
capturing a plurality of moving images of a sample at a plurality of focal positions, wherein
  each moving image of the plurality of moving images is captured for a specific time interval at a particular focal position of the plurality of focal positions, and
  the sample includes an observation object;
calculating a feature amount in each of the plurality of moving images, wherein
  a phase of movement of the observation object in a first moving image of the plurality of moving images is in alignment with a phase of the movement of the observation object in a second moving image of the plurality of moving images; and
calculating a reference position of the observation object, in a focus direction, based on the feature amount.

9. An analysis method, comprising:
capturing, by a moving image pickup device, a plurality of moving images of a sample at a plurality of focal positions, wherein
  each moving image of the plurality of moving images is captured for a specific time interval at a particular focal position of the plurality of focal positions, and
  the sample includes an observation object;
calculating, by circuitry of the moving image pickup device, a feature amount in each of the plurality of moving images, wherein
  a phase of movement of the observation object in a first moving image of the plurality of moving images is in alignment with a phase of the movement of the observation object in a second moving image of the plurality of moving images; and
calculating, by the circuitry, a reference position of the observation object, in a focus direction, based on the feature amount.

* * * * *